(12) United States Patent
Park

(10) Patent No.: US 10,298,935 B2
(45) Date of Patent: May 21, 2019

(54) METHOD OF MANAGING NETWORK BANDWIDTH BY CONTROL OF IMAGE COMPRESSION RATE AND FRAME GENERATION AND IMAGE TRANSMISSION SYSTEM USING THE SAME

(71) Applicant: ELECTRONICS AND TELECOMMUNICATIONS RESEARCH INSTITUTE, Daejeon (KR)

(72) Inventor: Chan Ho Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 263 days.

(21) Appl. No.: 15/215,383

(22) Filed: Jul. 20, 2016

(65) Prior Publication Data

US 2017/0272756 A1    Sep. 21, 2017

(30) Foreign Application Priority Data

Mar. 21, 2016  (KR) .......................... 10-2016-0033236

(51) Int. Cl.
*H04N 19/152*    (2014.01)
*H04N 19/124*    (2014.01)
(Continued)

(52) U.S. Cl.
CPC .......... *H04N 19/152* (2014.11); *H04L 47/12* (2013.01); *H04N 19/124* (2014.11);
(Continued)

(58) Field of Classification Search
CPC .. H04N 19/152; H04N 19/124; H04N 19/127; H04N 19/172; H04N 19/188; H04L 47/12
See application file for complete search history.

(56) References Cited

U.S. PATENT DOCUMENTS 5,138,447 A * 8/1992 Shen ..................... H04N 21/236
                                                      348/700
5,694,170 A * 12/1997 Tiwari ................. H04N 19/159
                                                      348/390.1
(Continued)

FOREIGN PATENT DOCUMENTS

KR    10-0975519 B1    8/2010

OTHER PUBLICATIONS

Chan Ho Park et al., "Network Bandwidth Management by control of video compressing rate", CEIC 2015 conference, Dec. 4, 2015, pp. 68-70.

*Primary Examiner* — Christopher G Findley

(57) ABSTRACT

A method of managing a network bandwidth by controlling of an image compression rate and controlling of a frame generation, and an image transmission system using the same are provided. The method includes approving generation of an intra-frame (I-frame) for one among a plurality of image compression hardware (H/W) units, storing compressed image data compressed by the plurality of image compression H/W units in a plurality of buffers corresponding to the plurality of image compression H/W units, controlling a data storage level of the plurality of buffers, and encapsulating the compressed image data stored in each of the plurality of buffers into a network packet and transmitting the encapsulated image data to the outside through an external network.

11 Claims, 7 Drawing Sheets

(51) Int. Cl.
  *H04N 19/127* (2014.01)
  *H04N 19/172* (2014.01)
  *H04N 19/169* (2014.01)
  *H04L 12/801* (2013.01)

(52) U.S. Cl.
  CPC ......... *H04N 19/127* (2014.11); *H04N 19/172* (2014.11); *H04N 19/188* (2014.11)

(56) References Cited

U.S. PATENT DOCUMENTS

| | | | |
|---|---|---|---|
| 8,175,147 B1 * | 5/2012 | Webb | H04N 19/197 348/497 |
| 8,514,937 B2 | 8/2013 | Han et al. | |
| 2013/0227102 A1 * | 8/2013 | Beck | H04L 65/4084 709/223 |
| 2013/0235159 A1 | 9/2013 | Kim et al. | |

* cited by examiner

METHOD OF MANAGING NETWORK BANDWIDTH BY CONTROL OF IMAGE COMPRESSION RATE AND FRAME GENERATION AND IMAGE TRANSMISSION SYSTEM USING THE SAME

CROSS-REFERENCE TO RELATED APPLICATION

This application claims priority to and the benefit of Korean Patent Application No. 10-2016-0033236, filed on Mar. 21, 2016, the disclosure of which is incorporated herein by reference in its entirety.

BACKGROUND

1. Field of the Invention

The present invention relates to technology of managing a network bandwidth used for image transmission, and more particularly, to a method of managing a network bandwidth by controlling of an image compression rate and controlling of frame generation and an image transmission system using the same.

2. Discussion of Related Art

Most of intelligent platform management interface (IPMI) solutions used for server management include a keyboard/video/mouse over an Internet protocol (KVM over IP, IP-based KVM) function. The function directly transmits an output image of a graphic card to a system manager. Further, when a small delay time is needed for a cloud service, the function may directly transmit the output image of the graphic card to a user of the cloud service.

In case of a high-resolution image, even though a compression operation is performed, a considerable network bandwidth is needed. For example, when there is a plurality of central processing units (CPUs) in one computing module such as a micro server or a blade server, or when a plurality of graphic outputs are compressed and transmitted in the cloud service, Total images which are simultaneously transmitted use a very great bandwidth. Further, when many images are simultaneously transmitted and the bandwidth of a network to the outside is small, a situation in which the service is not performed properly may occur.

SUMMARY OF THE INVENTION

The present invention is directed to a method of managing a network bandwidth capable of preventing packets from increasing instantaneously and performing a normal service in spite of a small bandwidth by controlling of an image compression rate and by controlling of a frame generation when transmitting images in a plurality of graphic cards through one external port, and an image transmission system using the same.

According to one aspect of the present invention, there is provided a method of managing a network bandwidth by controlling of an image compression rate and controlling of a frame generation, including: approving generation of an intra-frame (I-frame) for one among a plurality of image compression hardware (H/W) units; storing compressed image data from the plurality of image compression H/W units in a plurality of buffers corresponding to the plurality of image compression H/W units; controlling a data storage level of the plurality of buffers; and encapsulating the compressed image data stored in each of the plurality of buffers into a network packet, and transmitting the encapsulated image data to the outside through an external network.

The controlling scheme of buffer level may control the data storage level by giving a processing priority to one buffer in which the current data storage level is the highest among the plurality of buffers.

When the total amount of data of the plurality of buffers is equal to or more than the predetermined upper limit value, the controlling scheme of buffer level may control the quantization level of the image compression H/W unit connected to one buffer in which the current data storage level is the highest among the plurality of buffers.

The approving scheme of the generation of an I-frame for one among the plurality of image compression H/W units may include: receiving a Request signal, which requests a generation authority of an I-frame, from any one of the image compression H/W units in a KEY ON state; transmitting an OK signal to the image compression H/W unit transmitting the Request signal, and changing into a KEY OFF state so that another image compression H/W unit does not transmit the Request signal; and when the generation of an I-frame is completed in the authorized image compression H/W units, changing into the KEY ON state capable of receiving the Request signal from the plurality of image compression H/W units.

The approving scheme of the generation of an I-frame for one among the plurality of image compression H/W units may further include: during generation of an I-frame in the any one of the image compression H/W units or when there is no sufficient space in the buffer associated with the image compression H/W which requested the generation of an I-frame, outputting an I-Ready OFF signal so as to abandon the generation of the I-frame in the image compression H/W unit.

The outputting of the I-Ready OFF signal may include: receiving a BUF-OK signal representing whether to permit the generation of the I-frame by considering a remaining space of the plurality of buffers from a buffer space management module; and generating the I-Ready signal by considering the received BUF_OK signal, and the KEY ON or OFF state.

According to another aspect of the present invention, there is provided an image transmission system for managing a network bandwidth by controlling of an image compression rate and controlling of a frame generation, including: a frame control module configured to approve generation of an intra-frame (I-frame) for one among a plurality of image compression hardware (H/W) units; a plurality of buffers configured to store compressed image data compressed by the plurality of image compression H/W units; a network packet generator configured to encapsulate the compressed image data stored in each of the plurality of buffers into a network packet, and transmit the encapsulated image data to the outside through an external network; and a buffer space management module configured to control a data storage level of the plurality of buffers.

The buffer space management module may instruct the network packet generator to give a processing priority to a buffer in which the current data storage level is the highest among the plurality of buffers.

When the total amount of data of the plurality of buffers is equal to or more than the predetermined upper limit value, the buffer space management module may control the quantization level of the image compression H/W unit connected to one buffer in which the current data storage level is the highest among the plurality of buffers.

The frame control module may receive a Request signal, which requests a generation authority of an I-frame, from any one of image compression H/W units in a KEY ON state, transmit an OK signal to the image compression H/W unit transmitting the Request signal, change into a KEY OFF state so that another image compression H/W unit does not transmit the Request signal, and when the generation of an I-frame is completed in the authorized image compression H/W units, change into the KEY ON state capable of receiving the Request signal from the plurality of image compression H/W units.

During generation of an I-frame in the any one of the image compression H/W units or when there is no sufficient space in the buffer associated with the image compression H/W which requested the generation of an I-frame, the frame control module may output an I-Ready OFF signal so as to abandon the generation of the I-frame in the image compression H/W unit.

The frame control module may receive a BUF-OK signal representing whether to permit the generation of the I-frame by considering a remaining space of the plurality of buffers from the buffer space management module, and generate the I-Ready signal by considering the received BUF_OK signal, and the KEY ON or OFF state.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
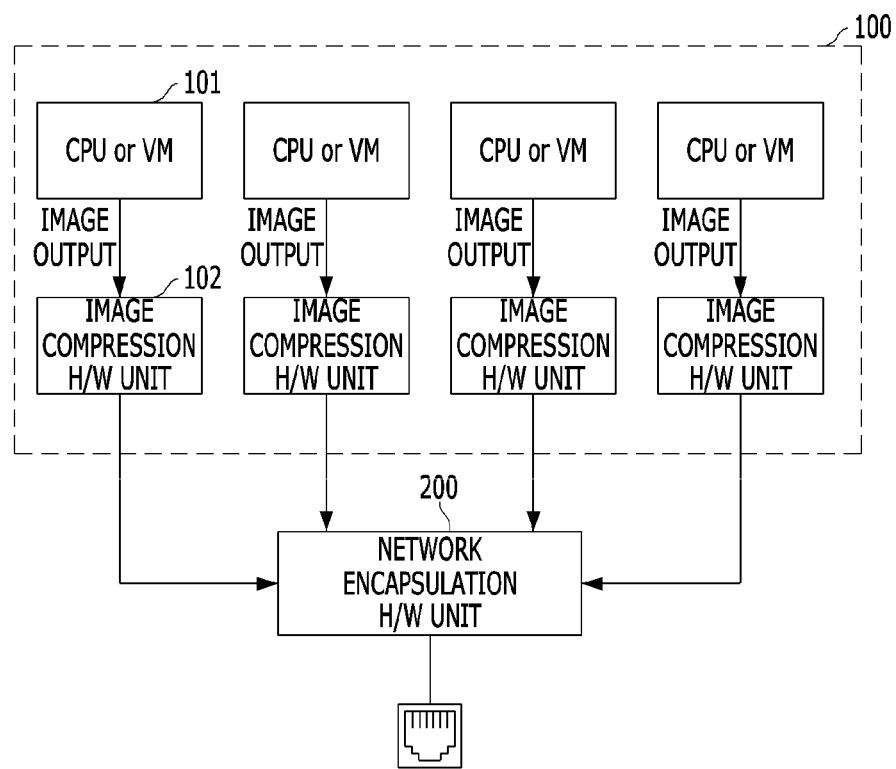
FIG. 1 is a block diagram of an image transmission system for managing a network bandwidth by controlling of an image compression rate and controlling of a frame generation according to an embodiment of the present invention.

The above and other objects, features and advantages of the present invention will become more apparent with reference to embodiments which will be described hereinafter with reference to the accompanying drawings. However, the present invention is not limited to embodiments which will be described hereinafter, and can be implemented as various different types. The embodiments of the present invention are described below in sufficient detail to enable those of ordinary skill in the art to embody and practice the present invention. The present invention is defined by its claims. Meanwhile, the terminology used herein to describe embodiments of the invention is not intended to limit the scope of the invention. The articles "a," "an," and "the" are singular in that they have a single referent, but the use of the singular form in the present document does not preclude the presence of more than one referent. It should be further understood that the terms "comprises," "comprising," "includes," and/or "including," when used herein, specify the presence of stated elements, steps, operations, and/or devices, but do not preclude the presence or addition of one or more other elements, steps, operations, and/or devices.

Hereinafter, embodiments of the present invention will be described with reference to accompanying drawings. When adding reference numerals to components of each drawing, the same reference numeral is added even when being shown in another drawing with respect to the same component, and when it is determined that a detailed description of a well-known technology related to the present invention can unnecessarily obscure the subject matter of the present invention, the description will be omitted.

FIG. 1 is a block diagram of an image transmission system for managing a network bandwidth by controlling of an image compression rate and controlling of a frame generation according to an embodiment of the present invention.

An image transmission system for managing a network bandwidth by controlling of an image compression rate and controlling of a frame generation according to an embodiment of the present invention may be applied to a computing module of a server or a low delay cloud system. For example, a plurality of central processing units (CPUs) 101 may be installed in a computing module 100 shown in FIG. 1 such as a micro server or a blade server.

Hereinafter, for convenience of explanation, an example in which a plurality of image compression hardware (H/W) units 102 and a network encapsulation H/W unit 200 may be installed in the micro server in which four CPUs 101 are installed and the low delay cloud service is provided by allocating one user per each CPU 101 will be described.

An image output from each of the plurality of CPUs 101 may be encapsulated into a network packet in order to support a keyboard/video/mouse over an internet protocol (KVM over IP, IP-based KVM), and the encapsulated image date may be output to an Ethernet port. In this case, an image in which a rendering is performed may directly be output from a graphic core embedded in each of the plurality of CPUs 101, and be output from a graphic card core connected to a peripheral component interconnect (PCI) bus, etc.

Here, each of the plurality of CPUs 101 may be configured as a virtual machine (VM) besides a physical CPU. For example, in the cloud service, a case in which the VM becomes a unit of the service is more than a case of using the plurality of CPUs 101. In this case, the output of the embedded graphic core of the CPU 101 and the output of the external graphic card may be mixed.

Since the output image described above exceeds 1 Giga bit per second (Gbps) although the output image has a high-definition (HD) resolution, the image can be transmitted only when the image is compressed. For this, the image compression H/W unit 102 may be used so as to correspond to each of the plurality of CPUs 101. The compressed image data compressed by the plurality of image compression H/W units 102 may be encapsulated into a network packet through the network encapsulation H/W unit 200, and the encapsulated image data may be transmitted to the outside.

A method of managing a network bandwidth by controlling of an image compression rate and controlling of a frame generation according to an embodiment of the present invention may be implemented in the network encapsulation H/W unit 200, and may include an interface with the image compression H/W unit 102.

Figure 2:
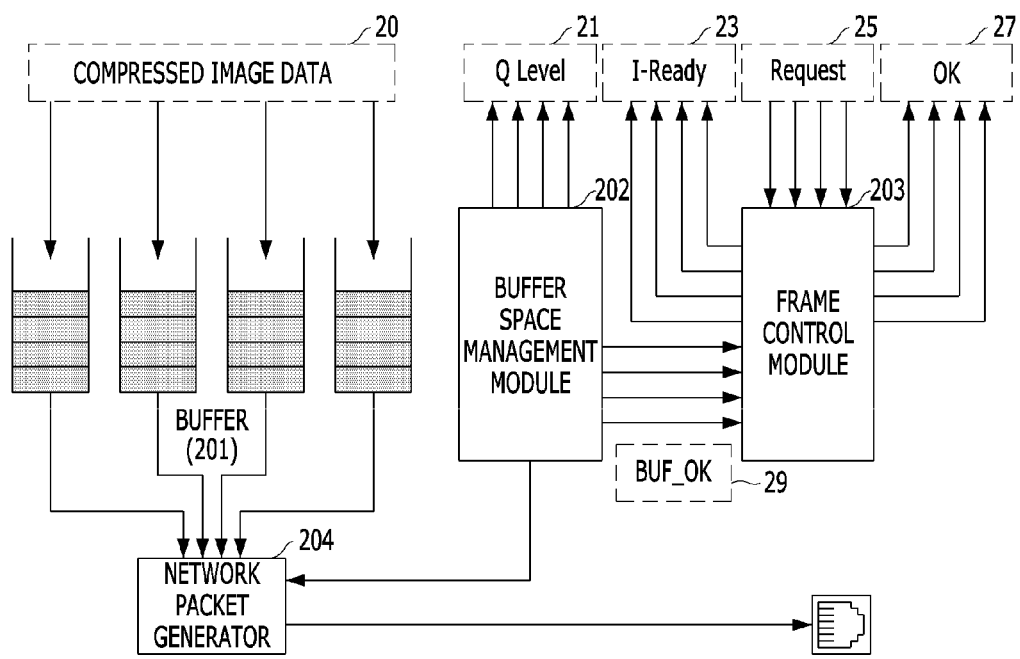
FIG. 2 is a block diagram of a network encapsulation hardware (H/W) unit for managing a network bandwidth by controlling of an image compression rate and controlling of a frame generation according to an embodiment of the present invention.

FIG. 2 is a block diagram of a network encapsulation hardware (H/W) unit for managing a network bandwidth by controlling of an image compression rate and controlling of a frame generation according to an embodiment of the present invention.

Compressed image data 20 generated by each of the plurality of image compression H/W units 102 may be stored in each of a plurality of buffers 201. A network packet generator 204 may transmit the compressed image data 20 stored in each of the plurality of buffers 201 by encapsulating the compressed image data 20 according to the network protocol. When transmitting the image without special management, the network encapsulation H/W unit 200 may be configured as only two blocks (the buffer 201 and the network packet generator 204).

However, in order to manage the network bandwidth by the control of the image compression rate and the control of frame generation according to an embodiment of the present invention, the network encapsulation H/W unit 200 may further include a buffer space management module 202 and a frame control module 203.

The buffer space management module 202 may largely have two functions.

First, the buffer space management module 202 may control a data storage level of the buffer 201. Generally, the network packet generator 204 may sequentially process the compressed image data 20 of each of the plurality of buffers 201 in units of network packet frame using a simple manner such as a round robin scheduling algorithm. However, when the data storage level of a specific buffer among the plurality of buffers 201 is high, the buffer space management module 202 may instruct the network packet generator 204 to give a priority to a corresponding buffer (a buffer having a high data storage level). Then, the network packet generator 204 may send multiple packets in series from the buffer with high priority through the external network port.

Second, the buffer space management module 202 may control a value of a Q level 21. Here, the Q level represents a quantization degree when compressing the image.

When the total amount of the compressed image data 20 is equal to or more than the predetermined upper limit value, an overflow of the buffer 201 may not be prevented by only allocating the processing priority of a buffer. Accordingly, when the sum of the amount of the compressed image data 20 is equal to or more than the upper limit value, the amount of the compressed image data 20 flowing into the buffer having the highest data storage level should be decreased.

For this, the buffer space management module 202 may control the Q level 21. That is, when the data storage level of the buffer is high, the buffer space management module 202 may decrease the amount of the image data by decreasing the image quality, and when the data storage level of the buffer is low, may again increase the quality of image.

Figure 3:
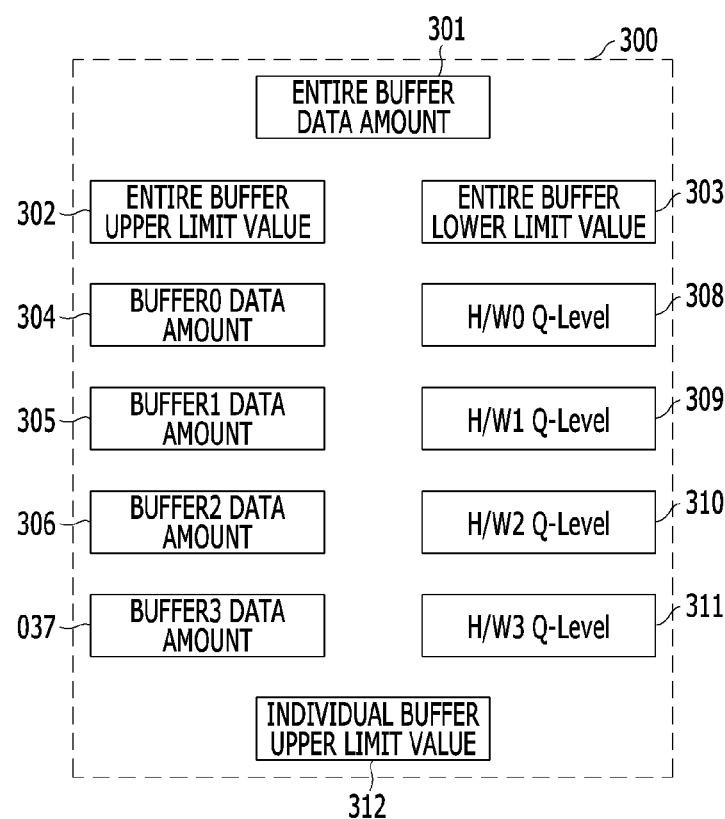
FIG. 3 is a diagram illustrating a register set managed in a buffer space management module according to an embodiment of the present invention.

For example, FIG. 3 illustrates a register set 300 managed in the buffer space management module 202 according to an embodiment of the present invention. An entire buffer data amount register 301 may be a register storing the total amount of data 304 to 307 of each buffer. Each of H/W Q-level registers 308 to 311 may be a register storing a current Q level of the image compression H/W unit connected to each buffer. A size of an entire buffer upper limit value register 302 may be a value determined when designing H/W. For example, when a size of each of four buffers is designed to have 1M and an upper limit value is set to 60%, the size of the entire buffer upper limit value register 302 may be designed to have 2.4M. Similarly, when a lower limit value is set to 20%, a size of an entire buffer lower limit value register 303 may be designed to have 0.8M. When the value of the entire buffer data amount register 301 exceeds that of the upper limit value register 302, the buffer having the greatest value among the amount of data 304 to 307 of each buffer may be searched for, and the value of a corresponding Q level register (one among 308 to 311) may be decreased as much as one level. When the value of the entire buffer data amount register 301 is smaller than that of the lower limit value register 303, a value of a register having the lowest value among the Q level registers 308 to 311 may be increased as much as one level. A size of an individual buffer upper limit value register 312 may also be determined when designing, and in the above case, if the upper limit value is set to 70%, a size of the individual buffer upper limit value register 312 may be set to have 0.7M. When one among the data amount registers 304 to 307 for the buffer exceeds the value of the individual buffer upper limit value register 312, the network packet generator 204 may operate by giving a priority to a data processing of a corresponding buffer. The same limit value may be used for generation of a BUF_OK signal 210, or some registers may be added for using additional values.

Meanwhile, the frame control module 203 may be used for an image compression codec in which frames are classified into an intra-frame (I-frame), a bidirectional-frame (B-frame), and a previous-frame (P-frame), etc. such as H.264. For example, in the image compression codec which always uses only the I-frame such as a motion joint photographic experts group (MJPEG), the frame control module 203 may not be used.

In a server management system or a cloud service such as data as a service (DaaS), there are so many cases in which a manager or a user watches a desktop screen. In this case, a frame having a great influence on an image quality may be the I-frame. Since a change of the image is not great in the case of the desktop screen, usually, the size of the B-frame or the P-frame is small and has very small influence on the image quality. Accordingly, the quantization level of the B-frame or the P-frame may not be changed from its initial value, and the compression rate applied to the Q level 21 may always be used only for the I-frame.

In this case, the number of other B-frames and P-frames inserted between the I-frames may be changeable. For example, the interval of I-frames may be fixed, or the I-frame can be inserted whenever a scene change is detected. When the interval of I-frame is dynamically changed, the image quality can be slightly changed but there is no problem for decrypting the image. So, the frame control module 203 may manage the network bandwidth using this.

A frame having the greatest size in the compressed image may be the I-frames. Accordingly, when multiple image compression H/W units 102 generate the I-frame simultaneously, the overflow may occur instantaneously. Accordingly, the frame control module 203 may perform an arbitration function so as to give an authority for generation of I-frame to only one among the plurality of image compression H/W units 102 at a time.

Meanwhile, a Request signal 25 shown in FIG. 2 may be a signal in which the image compression H/W unit 102 requests a generation authority of an I-frame to the frame control module 203, and an OK signal 27 may be a signal which shows an approval with respect to the request from the image compression H/W unit 102. When an I-Ready signal 23 is in an inactive state, the image compression H/W unit 102 may abandon the generation of the I-frame without requesting with Request signal 25 and waiting for the OK signal 27.

Figure 4:
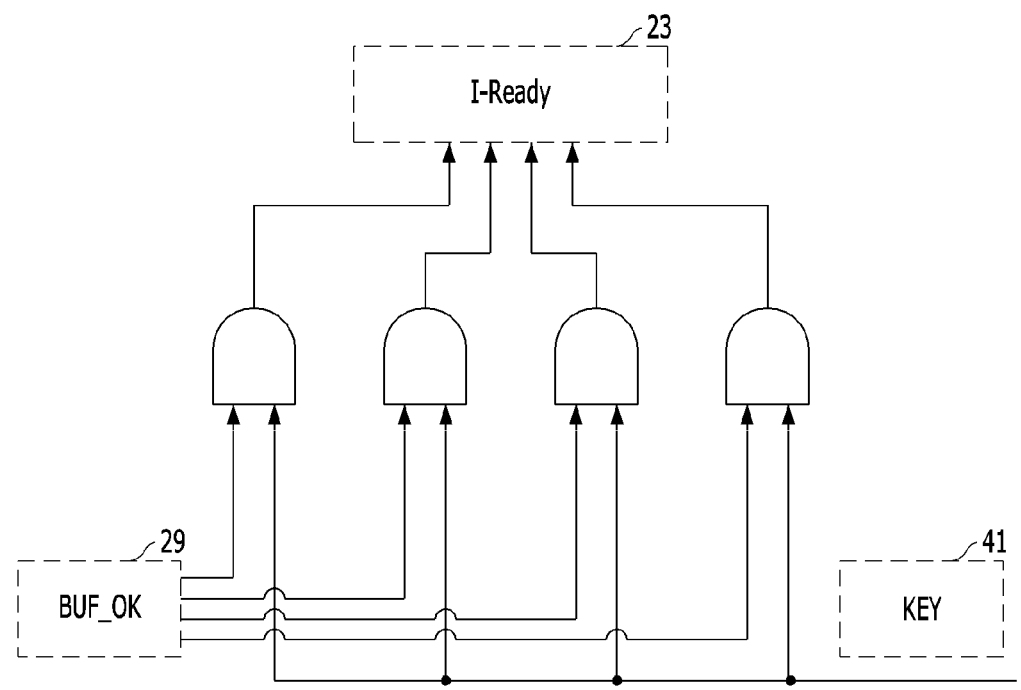
FIG. 4 is a reference diagram for describing generation of an I-Ready signal provided to an image compression module according to an embodiment of the present invention.

When the frame control module 203 is used, the buffer space management module 202 may provide an additional signal to the frame control module 203. The signal may be a signal for informing whether to permit the generation of the I-frame by considering the space of each buffer, and it is shown as a BUF_OK signal 29 in FIG. 2. The I-Ready signal 23 provided to the image compression H/W unit 102 may be configured by a combination of the BUF_OK signal 29 and a KEY signal 41 generated by the frame control module 203 as shown in FIG. 4.

Figure 5:
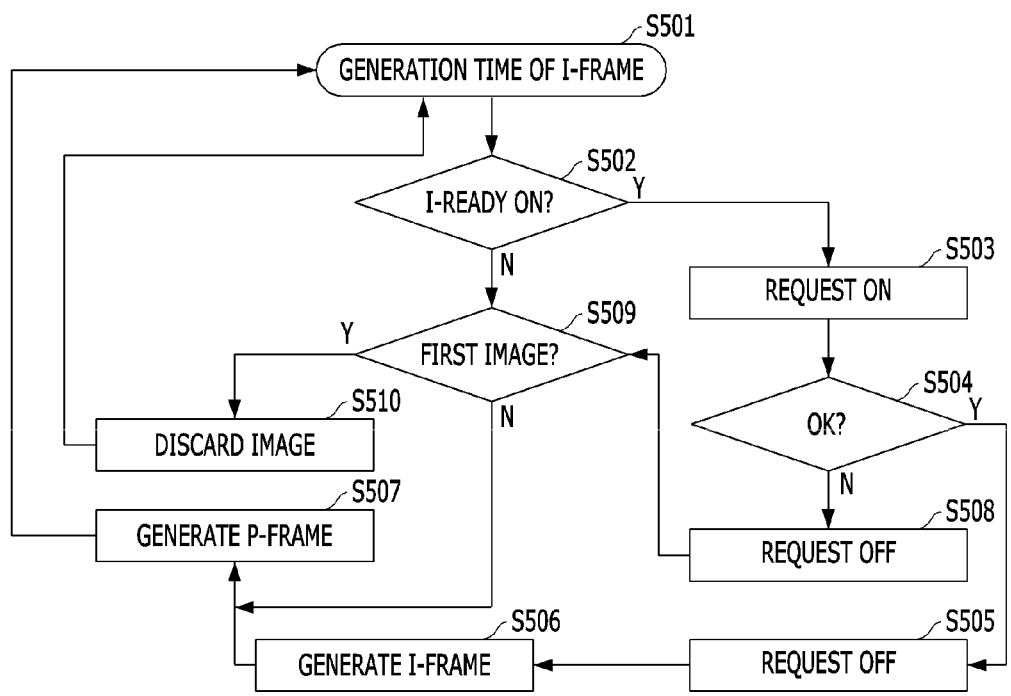
FIG. 5 is a flowchart for describing an operation of an image compression H/W unit according to an embodiment of the present invention.

With these signals, the image compression H/W unit 102 may perform an operation shown in FIG. 5. FIG. 5 is a flowchart for describing an operation of the image compression H/W unit according to an embodiment of the present invention. Generally, a codec such as a H.264 Baseline profile which do not use the B-frame in order to decrease a delay of an image encoding is used, and an example thereof is shown.

Hereinafter, unless specially described, it may be considered that the operation is performed in an arbitrary one of the plurality of image compression H/W units 102.

First, when starting to operate initially, the image compression H/W unit 102 should generate an I-frame. For this, when an I-frame generation time is reached (S501), the image compression H/W unit 102 may first confirm whether the I-Ready signal 23 is in an ON state (S502).

Based on the confirmation result in the operation S502, when the I-Ready signal 23 is in the ON state, since there is no core which generates an I-frame, the image compression H/W unit 102 may request a permission with the Request signal 25 to the frame control module 203 (S503).

Generally most of the image compression H/W units 102 receive the OK signal 27. However, rarely there may be two or more requests in the same clock, so, the image compression H/W unit 102 should confirm the OK signal 27 (S504).

Based on the confirmation result in the operation S504, when the OK signal 27 is confirmed, the image compression H/W unit 102 may change the Request signal 25 into an OFF state (S505), and generate the I-frame (S506).

After generating the I-frame, the image compression H/W unit 102 may further generate a P-Frame several times (S507), and move to the generation time of the I-frame (S501).

When the OK signal 27 is not received in the operation S504, since another core requested the Request signal 25 and a generation of an I-frame from another core is being performed, the I-frame should not be generated. The image compression H/W unit 102 may change the Request signal 25 into an OFF state (S508), and confirm whether the image to be compressed is the first image (S509). This is because the P-frame cannot be generated if there is no previous image. Based on the confirmation result in the operation S509, when the image to be compressed is the first image, the image compression H/W unit 102 may discard the image (S510), and when the image to be compressed is not the first image, may generate the P-frames (S507).

Meanwhile, based on the confirmation result in the operation S502, when the I-Ready signal 23 is not in the ON state, since there is a core which generates the I-frame or there is no sufficient space in the buffer, the image compression H/W unit 102 moves to the next state (S509). In this state, the image compression H/W unit 102 may discard the image when the image is the first image (S510), and may generate the P-frame when the image is not the first image.

Figure 6:
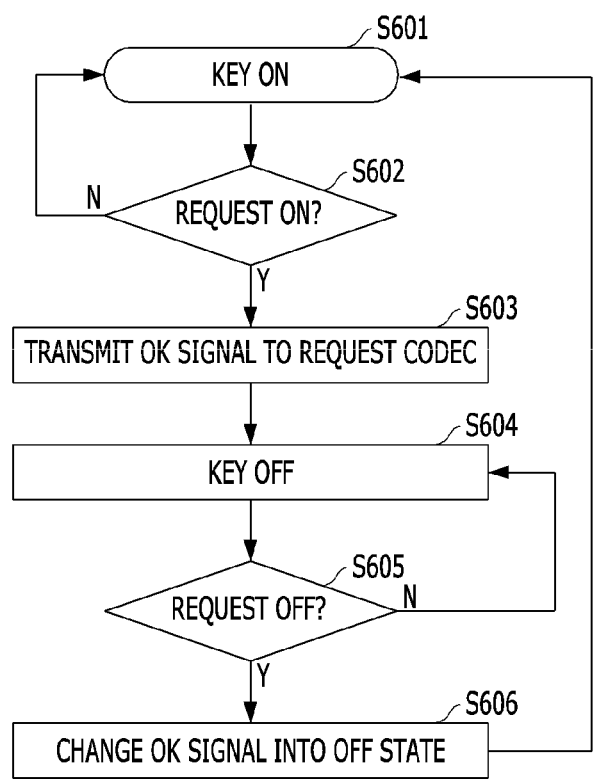
FIG. 6 is a flowchart for describing an operation of a frame control module according to an embodiment of the present invention.

FIG. 6 is a flowchart for describing an operation of a frame control module according to an embodiment of the present invention.

Hereinafter, unless specially described, it may be considered that the operation is performed in the frame control module 203.

First, when no core performs generation of an I-frame, the frame control module 203 may be in the KEY ON state (S601). In this state, when the Request signal 25 is received from one among the plurality of image compression H/W units (S602), the OK signal 27 may be transmitted to a corresponding codec (the image compression H/W unit requesting the Request signal) (S603). In the case that two or more Request signals 25 are received, the frame control module 203 should transmit the OK signal 27 to only one of the image compression H/W units 102.

When the Request signal 25 is not received, the frame control module 203 may be remained in the KEY ON state.

After transmitting the OK signal 27 to the request codec, the KEY may be changed into the OFF state so that other cores do not transmit the Request signal 25 (S604), and continuously confirm whether the Request signal 25 which is currently received is inactivated (S605).

Based on the confirmation result in the operation S605, when the Request signal 25 is inactivated, the OK signal may be changed into the OFF state (S606), the KEY ON state which is an initial state may be recovered by changing the KEY into the ON state.

By using the compression rate and frame control method according to an embodiment of the present invention, when transmitting the image of the system for management using the KVM over IP method or the user image of the low delay cloud service, a plurality of images may be transmitted simultaneously without any problems even when the bandwidth of the external port is limited.

Figure 7:
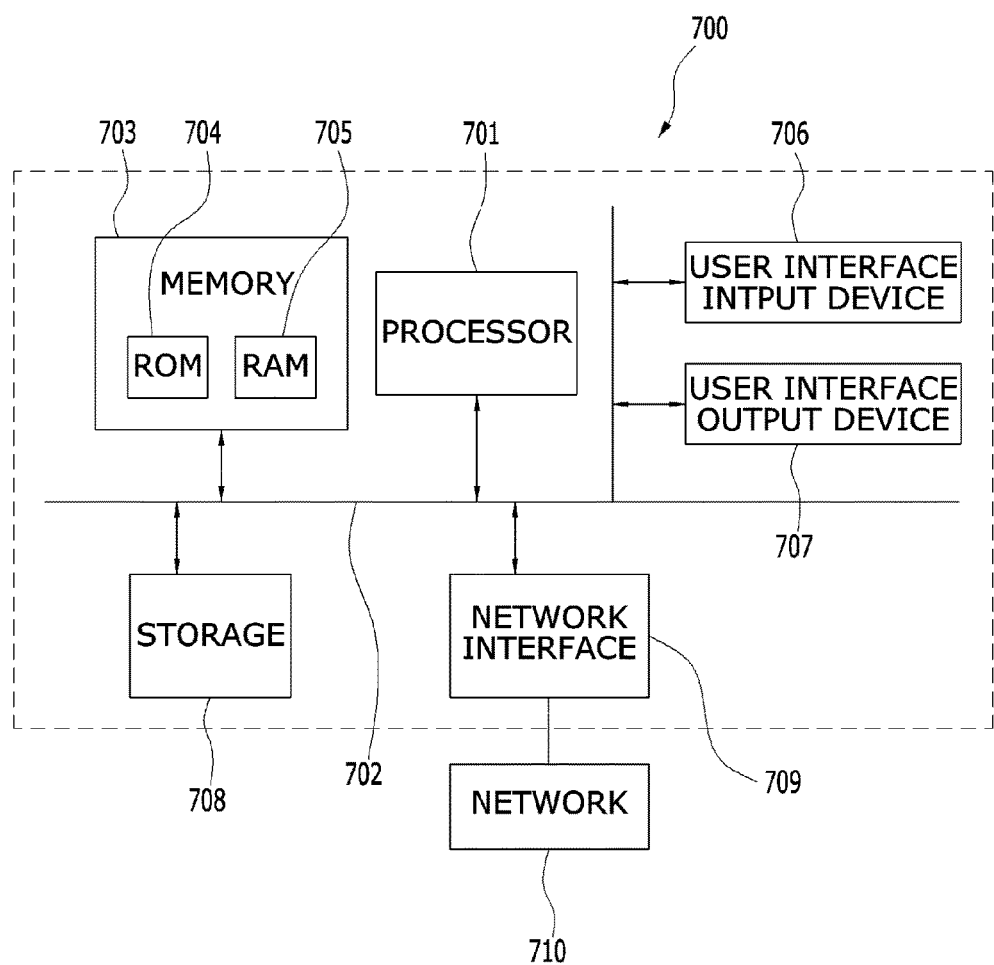
FIG. 7 is a block diagram illustrating a computer system for the present invention.

An embodiment of the present invention may be implemented in a computer system, e.g., as a computer readable medium. As shown in in FIG. 7, a computer system 700 may include one or more of a processor 701, a memory 703, a user input device 706, a user output device 707, and a storage 708, each of which communicates through a bus 702. The computer system 700 may also include a network interface 709 that is coupled to a network 710. The processor 701 may be a central processing unit (CPU) or a semiconductor device that executes processing instructions stored in the memory 703 and/or the storage 708. The memory 703 and the storage 708 may include various forms of volatile or non-volatile storage media. For example, the memory may include a read-only memory (ROM) 704 and a random access memory (RAM) 705.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

The above-described embodiments of the present invention are merely examples, and it should be apparent to those skilled in the art that various modifications may be made to the above-described embodiments of the present invention without departing from the spirit or the scope of the invention. Accordingly, it should be understood that the embodiments of the present invention are not intended to limit the scope of the invention but to describe the invention in all aspects. The scope of the present invention should be defined by the appended claims, and it is intended that the present invention covers all such modifications provided they come within the scope of the appended claims and their equivalents.

What is claimed is:

1. A method of managing a network bandwidth by controlling of an image compression rate and controlling of a frame generation, comprising:
    approving generation of an intra-frame (I-frame) for one among a plurality of image compression hardware (H/W) units; by:
        receiving a Request signal which requests a generation authority of an I-frame, from any one of the image compression H/W units in a KEY ON state;
        transmitting an OK signal to the image compression H/W unit transmitting the Request signal, and changing into a KEY OFF state so that another image compression H/W unit does not transmit the Request signal; and
        when the generation of an I-frame is completed in an authorized image compression H/W unit, changing into the KEY ON state capable of receiving the Request signal from the plurality of image compression H/W units;
    storing compressed image data compressed by the plurality of image compression H/W units in a plurality of buffers corresponding to the plurality of image compression H/W units;
    controlling a data storage level of the plurality of buffers; and
    encapsulating the compressed image data stored in each of the plurality of buffers into a network packet, and transmitting the encapsulated and compressed image data to the outside through an external network.

2. The method of managing the network bandwidth by controlling of the image compression rate and controlling of the frame generation of claim 1, wherein the controlling scheme of buffer level controls the data storage level by giving a processing priority to one buffer in which the current data storage level is the highest among the plurality of buffers.

3. The method of managing the network bandwidth by the controlling of the image compression rate and controlling of the frame generation of claim 2, wherein, when the total amount of data of the plurality of buffers is equal to or more than the predetermined upper limit value, the controlling scheme of buffer level controls the quantization level of the image compression H/W unit connected to one buffer in which the current data storage level is the highest among the plurality of buffers.

4. The method of managing the network bandwidth by the controlling of the image compression rate and controlling of the frame generation of claim 3, wherein the approving scheme of the generation of the I-frame for one among the plurality of image compression H/W units further includes:
    during generation of an I-frame in the any one of the image compression H/W units or when there is no sufficient space in the buffer associated with the image compression H/W which requested the generation of an I-frame, outputting an I-Ready OFF signal so as to abandon the generation of the I-frame in the image compression H/W unit.

5. The method of managing the network bandwidth by the controlling of the image compression rate and controlling of the frame generation of claim 4, wherein the outputting of the I-Ready OFF signal includes:
    receiving a BUF-OK signal representing whether to permit the generation of the I-frame by considering a remaining space of the plurality of buffers from a buffer space management module; and
    generating the I-Ready signal by considering the received BUF_OK signal, and the KEY ON or OFF state.

6. An image transmission system for managing a network bandwidth by controlling of an image compression rate and controlling of a frame generation, comprising:
    a frame control module configured to approve generation of an intra-frame (I-frame) for one among a plurality of image compression hardware (H/W) units;
    a plurality of buffers configured to store compressed image data compressed by the plurality of image compression H/W units corresponding to the plurality of image compression H/W units;
    a network packet generator configured to encapsulate the compressed image data stored in each of the plurality of buffers into a network packet, and transmit the encapsulated image data to the outside through an external network; and
    a buffer space management module configured to control a data storage level of the plurality of buffers,
    wherein the frame control module receives a Request signal, which requests a generation authority of an I-frame, from any one of the image compression H/W units in a KEY ON state, transmits an OK signal to the image compression H/W unit transmitting the Request signal, changes into a KEY OFF state so that another image compression H/W unit does not transmit the Request signal, and when the generation of an I-frame is completed in the authorized image compression H/W units, changes into the KEY ON state capable of receiving the Request signal from the plurality of image compression H/W units.

7. The image transmission system for managing the network bandwidth by the controlling of the image compression rate and controlling of the frame generation of claim 6, wherein the buffer space management module instructs the network packet generator to give a processing priority to a buffer in which the current data storage level is the highest among the plurality of buffers.

8. The image transmission system for managing the network bandwidth by the controlling of the image compression rate and controlling of the frame generation of claim 7, wherein the buffer space management module controls the data storage level by giving a processing priority to one buffer in which the current data storage level is the highest among the plurality of buffers.

9. The image transmission system for managing the network bandwidth by the controlling of the image compression rate and controlling of the frame generation of claim 8, wherein, when the total amount of data of the plurality of buffers is equal to or more than the predetermined upper limit value, the buffer space management module controls the quantization level of the image compression H/W unit connected to any one buffer in which the current data storage level is the highest among the plurality of buffers.

10. The image transmission system for managing the network bandwidth by the controlling of the image compression rate and controlling of the frame generation of claim 9, wherein, during generation of an I-frame in the any one of the image compression H/W units or when there is no sufficient space in the buffer associated with the image compression H/W which requested the generation of an I-frame, the frame control module outputs an I-Ready OFF signal so as to abandon the generation of the I-frame in the image compression H/W unit.

11. The image transmission system for managing the network bandwidth by the controlling of the image compression rate and controlling of the frame generation of claim 10, wherein the frame control module receives a BUF-OK signal representing whether to permit the generation of the I-frame by considering a remaining space of the plurality of buffers from the buffer space management module, and generates the I-Ready signal by considering the received BUF_OK signal, and the KEY ON or OFF state.

* * * * *